United States Patent
Kim

(10) Patent No.: US 11,842,220 B2
(45) Date of Patent: Dec. 12, 2023

(54) PARALLELIZATION METHOD AND APPARATUS WITH PROCESSING OF NEURAL NETWORK MODEL FOR MANYCORE SYSTEM

(71) Applicant: SAMSUNG ELECTRONICS CO., LTD., Suwon-si (KR)

(72) Inventor: Jaeyeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 17/224,428

(22) Filed: Apr. 7, 2021

(65) Prior Publication Data

US 2022/0129325 A1 Apr. 28, 2022

(30) Foreign Application Priority Data

Oct. 28, 2020 (KR) .......... 10-2020-0141365

(51) Int. Cl.
*G06F 9/50* (2006.01)
*G06N 3/063* (2023.01)
*G06F 15/80* (2006.01)

(52) U.S. Cl.
CPC .......... *G06F 9/5061* (2013.01); *G06F 15/80* (2013.01); *G06N 3/063* (2013.01)

(58) Field of Classification Search
CPC ..... G06N 3/063; G06F 9/5027; G06F 9/5061; G06F 15/80
See application file for complete search history.

(56) References Cited

U.S. PATENT DOCUMENTS

| | | | |
|---|---|---|---|
| 2017/0193361 A1* | 7/2017 | Chilimbi | G06N 3/084 |
| 2019/0155620 A1 | 5/2019 | Arunachalam et al. | |
| 2019/0205736 A1 | 7/2019 | Bleiweiss et al. | |
| 2019/0362227 A1* | 11/2019 | Seshadri | G06N 3/063 |
| 2020/0151088 A1 | 5/2020 | Gu et al. | |
| 2020/0301739 A1* | 9/2020 | Xu | G06N 3/063 |

(Continued)

FOREIGN PATENT DOCUMENTS

| | | |
|---|---|---|
| JP | 2005-316888 A | 11/2005 |
| KR | 10-2020-0020117 A | 2/2020 |

(Continued)

OTHER PUBLICATIONS

Microsoft, Distributed Training of Deep Learning Models on Azure, Microsoft, Jul. 15, 2021 (https://docs.microsoft.com/enus/azure/architecture/referencearchitectures/ai/training-deep-learning).

(Continued)

*Primary Examiner* — Jacob Petranek
(74) *Attorney, Agent, or Firm* — NSIP Law

(57) ABSTRACT

A parallelization method includes: generating a profiling result by performing profiling on a target neural network based on model information of the target neural network and architecture information of a manycore system; determining an assignment strategy to assign a plurality of cores of each of a plurality of clusters of the manycore system to a plurality of layers of the target neural network, based on the profiling result; and generating a parallelization strategy for parallel processing of the manycore system based on the assignment strategy.

21 Claims, 12 Drawing Sheets

(56) References Cited

U.S. PATENT DOCUMENTS

2020/0319919 A1* 10/2020 Che .................... G06F 16/9035
2021/0110247 A1* 4/2021 Venkataramani ... G06F 11/3466

FOREIGN PATENT DOCUMENTS

KR 10-2020-0023239 A 3/2020
KR 10-2020-0067632 A 6/2020

OTHER PUBLICATIONS

Guan, Lei, et al. "XPipe: Efficient pipeline model parallelism for multi-GPU DNN training." arXiv preprint arXiv:1911.04610 (2019) (9 pages in English).

Huang, Yanping, et al. "GPipe: Easy Scaling with Micro-Batch Pipeline Parallelism." arXiv preprint arXiv:1811.06965 (2019) (11 pages in English).

Harlap, Aaron, et al. "Pipedream: Fast and efficient pipeline parallel dnn training." arXiv preprint arXiv:1806.03377 (2018) (14 pages in English).

Wang, Siqi, et al. "High-throughput CNN inference on embedded ARM Big.LITTLE multicore processors." IEEE Transactions on Computer-Aided Design of Integrated Circuits and Systems 39.10 (2019): 2254-2267 (14 pages in English).

Jia, Zhihao, Matei Zaharia, and Alex Aiken. "Beyond data and model parallelism for deep neural networks." arXiv preprint arXiv:1807.05358 (2018) (15 pages in English).

* cited by examiner

| Classification | Amount of operation assigned before redistribution | Residual computational capability | Amount of operation assigned after redistribution |
|---|---|---|---|
| First cluster | 175 | 25 | 175 |
| Second cluster | 146 | 54 | 206 |
| Third cluster | 182 | 18 | 187 |
| Fourth cluster | 130 | 70 | 185 |

FIG.4C

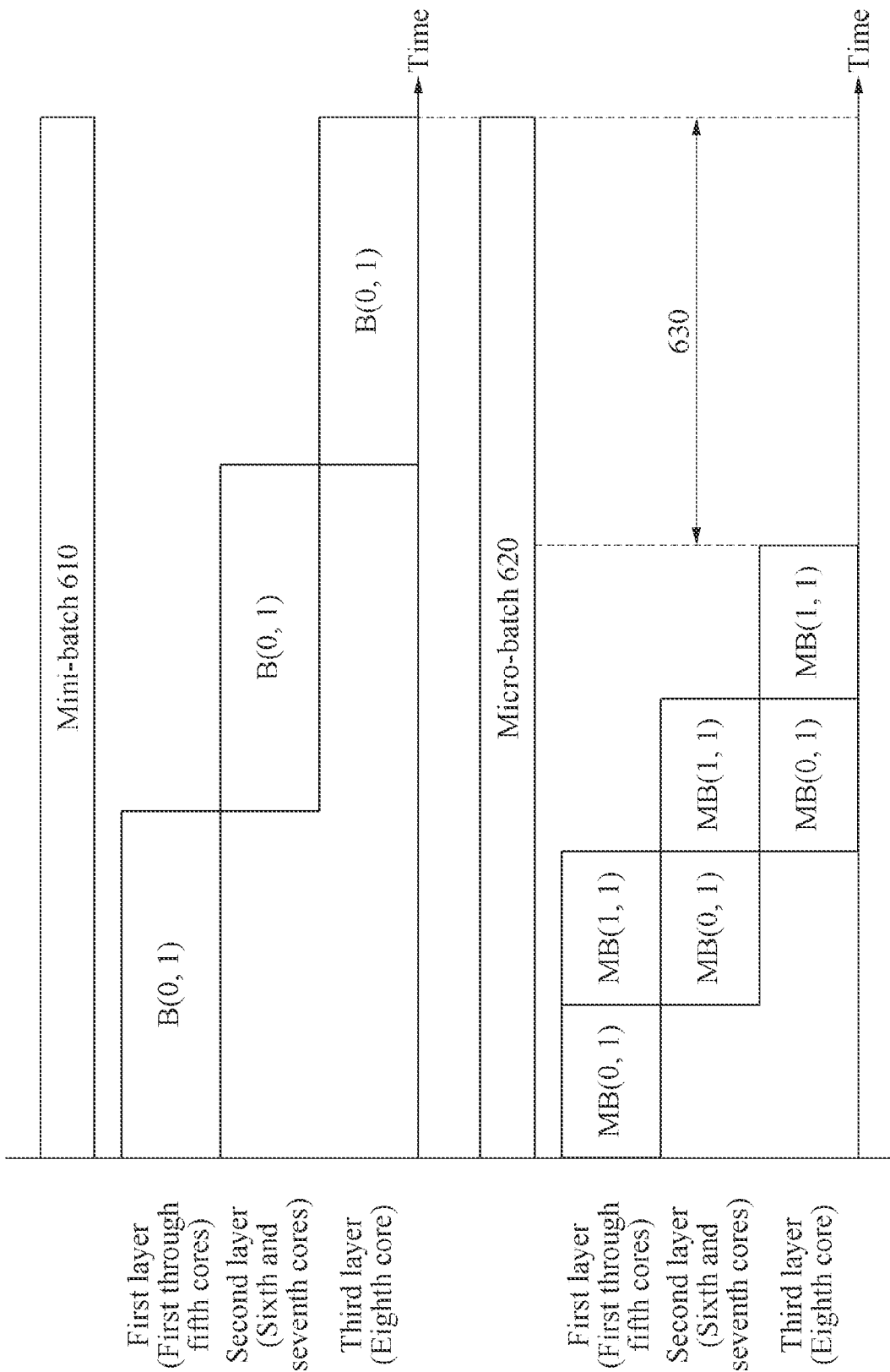

PARALLELIZATION METHOD AND APPARATUS WITH PROCESSING OF NEURAL NETWORK MODEL FOR MANYCORE SYSTEM

CROSS-REFERENCE TO RELATED APPLICATIONS

This application claims the benefit under 35 USC § 119(a) of Korean Patent Application No. 10-2020-0141365, filed on Oct. 28, 2020, in the Korean Intellectual Property Office, the entire disclosure of which is incorporated herein by reference for all purposes.

BACKGROUND

1. Field

The following description relates to a parallelization method and apparatus with processing of a neural network model for a manycore system.

2. Description of Related Art

Technical automation of a recognition process may be implemented using, for example, a neural network model implemented by a processor as a special calculation structure, which may provide a computationally intuitive mapping between an input pattern and an output pattern after considerable training. An ability to be trained to generate such mapping may be referred to as a "training ability of a neural network." Moreover, due to specialized training, such a specialized and trained neural network may have a generalization ability to generate a relatively accurate output for an input pattern that is not used in training. To process operations related to training and inference of a neural network model, model parallelization and/or data parallelization may be used as a method of more quickly converging to a result.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a parallelization method includes: generating a profiling result by performing profiling on a target neural network based on model information of the target neural network and architecture information of a manycore system; determining an assignment strategy to assign a plurality of cores of each of a plurality of clusters of the manycore system to a plurality of layers of the target neural network, based on the profiling result; and generating a parallelization strategy for parallel processing of the manycore system based on the assignment strategy.

The profiling result may include any one or any combination of a time for a single core of the manycore system to execute a single layer of the target neural network, a time for a single cluster of the manycore system to execute a single layer of the target neural network, and a communication cost to transmit processing results between cores of the manycore system.

The generating of the profiling result may include generating the profiling result by pre-executing the target neural network based on test data.

The determining of the assignment strategy may include: partitioning the target neural network into a plurality of sub-networks and distributing the plurality of sub-networks to the plurality of clusters; and assigning a plurality of cores of each of the plurality of clusters to one or more layers of a corresponding sub-network among the plurality of sub-networks.

Each of the plurality of sub-networks may include either one of a single layer and a plurality of consecutive layers among the plurality of layers of the target neural network.

The partitioning of the target neural network may include: partitioning the target neural network into the plurality of sub-networks based on a time for a single cluster of the manycore system to execute a single layer of the target neural network; and distributing the plurality of sub-networks to the plurality of clusters.

The assigning of the plurality of cores to the one or more layers may include assigning the plurality of cores to the one or more layers based on a time for a single core of the manycore system to execute a single layer of the target neural network.

The assigning of the plurality of cores to the one or more layers may include assigning the plurality of cores to the one or more layers based on a characteristic of each layer of the corresponding sub-network.

The characteristic of each layer may include any one or any combination of an amount of computational operation for processing of each layer and an amount of communication traffic for transmitting a processing result of each layer.

For the assigning of the plurality of cores to the one or more layers, a higher priority is assigned to the amount of computational operation than to the amount of communication traffic.

The method may include generating a batch strategy comprising a number of micro-batches based on assignment states of the plurality of cores according to the assignment strategy.

A non-transitory computer-readable storage medium may store instructions that, when executed by a processor, configure the processor to perform the method.

In another general aspect, a parallelization apparatus includes: a processor configured to: generate a profiling result by performing profiling on a target neural network based on model information of the target neural network and architecture information of a manycore system; determine an assignment strategy to assign a plurality of cores of each of a plurality of clusters of the manycore system to a plurality of layers of the target neural network, based on the profiling result; and generate a parallelization strategy for parallel processing of the manycore system based on the assignment strategy.

The profiling result may include any one or any combination of a time for a single core of the manycore system to execute a single layer of the target neural network, a time for a single cluster of the manycore system to execute a single layer of the target neural network, and a communication cost to transmit processing results between cores of the manycore system.

For the generating of the profiling result, the processor may be configured to generate the profiling result by pre-executing the target neural network based on test data.

For the determining of the assignment strategy, the processor may be configured to: partition the target neural network into a plurality of sub-networks, to distribute the plurality of sub-networks to the plurality of clusters; and assign a plurality of cores of each of the plurality of clusters to one or more layers of a corresponding sub-network among the plurality of sub-networks, to determine the assignment strategy.

For the partitioning of the target neural network, the processor may be configured to: partition the target neural network into the plurality of sub-networks based on a time for a single cluster of the manycore system to execute a single layer of the target neural network; and distribute the plurality of sub-networks to the plurality of clusters.

For the assigning of the plurality of cores to the one or more layers, the processor may be configured to assign the plurality of cores to the one or more layers based on a time for a single core of the manycore system to execute a single layer of the target neural network.

For the assigning of the plurality of cores to the one or more layers, the processor may be configured to assign the plurality of cores to the one or more layers based on a characteristic of each layer of the corresponding sub-network.

The processor may be configured to further generate a batch strategy comprising a number of micro-batches based on assignment states of the plurality of cores according to the assignment strategy.

The apparatus may include a memory storing instructions that, when executed by the processor, configure the processor to perform the generating of the profiling result, the determining of the assignment strategy, and the generating of the parallelization strategy.

In another general aspect, a parallelization method includes: determining, for each cluster of a manycore system, a sub-network including one or more layers of a target neural network to be executed by the cluster, based on execution times of the one or more layers and an optimal execution time of the cluster; determining, for each core of each cluster, a layer of the determined sub-network to be processed by the core; and generating output information by processing, in each cluster, one or more batches based on the determined sub-network and the determined layers.

The determining of the sub-network for each cluster may include determining, for each cluster, the sub-network to include a maximum number of consecutive layers of the target neural network having a sum of execution times less than or equal to the optimal execution time of the cluster.

The determining of the sub-network for each cluster may include, in response to one or more layers of the target neural network not being included in the sub-networks, redetermining the sub-networks based on residual computational capabilities of the clusters.

Other features and aspects will be apparent from the following detailed description, the drawings, and the claims.

BRIEF DESCRIPTION OF THE DRAWINGS

FIGS. 4A, 4B and 4C illustrate examples of a process of distributing sub-networks.

FIGS. 6A and 6B illustrate an example of a mini-batch and an example of a micro-batch.

Figure 1:
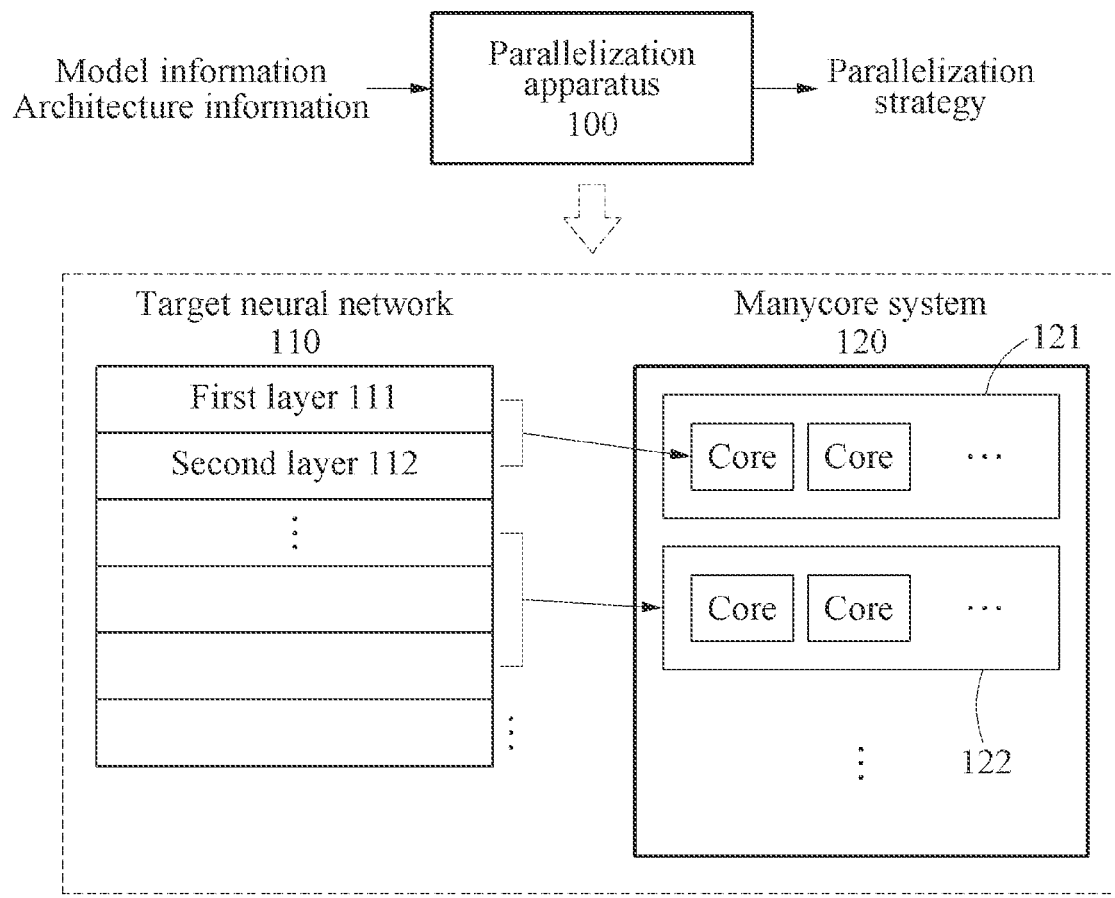
FIG. 1 illustrates an example of a process of generating a parallelization strategy.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various members, components, regions, layers, or sections, the members, components, regions, layers, or sections are not limited to the terms. These terms should be used only to distinguish one member, component, region, layer, or section from another member, component, region, layer, or section. For example, a "first" member, component, region, layer, or section referred to in examples described herein may also be referred to as a "second" member, component, region, layer, or section, or similarly, and the "second" member, component, region, layer, or section may be referred to as the "first" member, component, region, layer, or section within the scope of the right according to the concept of the present disclosure.

Throughout the specification, it will be understood that when a component or element is referred to as being "on," "connected to" or "coupled to" another component or element, it may be directly on, connected to, or coupled to the other component or element, or there may be one or more intervening elements therebetween. In contrast, when a component or element is referred to as being "directly on," "directly connected to," or "directly coupled to" another component or element, there are no intervening components or elements present. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein including technical or scientific terms have the same meanings as those generally understood. Terms defined in dictionaries generally used should be construed to have meanings matching with contextual meanings in the related art and the present disclosure, and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 illustrates an example of a process of generating a parallelization strategy. Referring to FIG. 1, a parallelization apparatus 100 may generate a parallelization strategy for parallel processing of a target neural network 110 through a manycore system 120 based on model information and architecture information. Processing of the target neural network 110 may include processing of an operation of training and/or inferring using the target neural network 110. The parallel processing may include pipeline processing.

A neural network may be trained based on deep learning, and may perform an operation (for example, an object recognition operation or a user authentication operation) suitable for the purpose of training, by mapping input data and output data that are in a nonlinear relationship. The target neural network 110 may refer to a neural network to be parallelized among neural networks. The deep learning may be a machine learning scheme for solving an issue such as image or voice recognition from a big data set. The deep learning may be understood as a process of solving an optimization issue to find a point at which energy is minimized while training the neural network based on prepared training data.

Through supervised or unsupervised learning of the deep learning, a structure of the neural network or a weight corresponding to a model may be obtained or determined, and input data and output data may be mapped to each other through the weight. For example, when a width and a depth of the neural network are sufficiently large, the neural network may have a capacity large enough to implement an arbitrary function. When the neural network is trained on a sufficiently large quantity of training data through an appropriate training process, an optimal performance may be achieved.

In the following description, the neural network or network parameters (for example, weights) may be expressed as being "pre-trained", where "pre-" may indicate a state before the neural network is "started". The "started" neural network may indicate that the neural network may be ready for inference. For example, "start" of the neural network may include a loading of the neural network in a memory, or an input of input data for inference to the neural network after the neural network is loaded in the memory.

The neural network may include a plurality of layers. In this example, the neural network may be referred to as a deep neural network (DNN). The plurality of layers may include an input layer, at least one hidden layer, and an output layer. The neural network 110 may include various types of networks (for example, a fully connected network (FCN), a convolutional neural network (CNN), and/or a recurrent neural network (RNN)).

The parallelization apparatus 100 may use a parallelization policy as a scheme of more quickly converging to a result to process an operation related to training and/or inference of the target neural network 110. The parallelization apparatus 100 may establish a parallelization strategy to process the target neural network 110 in the manycore system 120. The manycore system 120 may include a plurality of clusters (for example, a first cluster 121 and a second cluster 122) that each include a plurality of cores, and may process a given operation using the cores. The manycore system 120 may be used as an accelerator for the special purpose (for example, processing of the neural network). The parallelization apparatus 100 may establish a parallelization strategy specialized for the manycore system 120.

For example, the parallelization apparatus 100 may generate a profiling result by performing profiling on the target neural network 110 based on model information of the target neural network 110 and architecture information of the manycore system 120.

The model information may include structure information, operation information and characteristic information of the target neural network 110. The structure information may be information of each layer included in the target neural network 110. The information of each layer may include, for example, a type of each layer (for example, a convolution layer, a pooling layer, or a fully-connected layer), a number of layers, and a connection relationship between layers. The operation information may indicate a type of operations performed in each layer (for example, a multiplication, an addition, a multiplication and accumulation (MAC), or a shift) and how many operations to be performed. Also, the characteristic information may indicate a layer with a large number of operations, a layer with a large number of weight parameters, and thus may indicate whether a communication cost is high. The characteristic information may be information that may be generally applied to a neural network, not information specialized for the target neural network 110.

The architecture information may include cluster information, core information, and communication information of the manycore system 120. The cluster information may include a processing speed of each cluster, a number of cores included in each cluster, a capacity of a memory, and a characteristic of a controller. The core information may include a processing speed of each core, a capacity of a memory included in each core, a capacity of a buffer, and a characteristic of a controller. A processing speed of a cluster may be determined based on processing speeds of cores included in the cluster. The communication information may include a communication speed between clusters and a communication speed between cores.

The profiling result may include any one or any combination of a time required for a single core of the manycore system 120 to execute a single layer of the target neural network 110, a time required for a single cluster of the manycore system 120 to execute a single layer of the target neural network 110, and a communication cost required to transmit processing results between cores of the manycore system 120. The parallelization apparatus 100 may pre-execute the target neural network 110 based on test data to generate the profiling result, if necessary.

The parallelization apparatus 100 may determine an amount of computational operation of each layer based on the operation information of the target neural network 110. Also, the parallelization apparatus 100 may analyze a time required for a core of the manycore system 120 to execute each layer based on a processing speed of the core and an amount of computational operation. The parallelization apparatus 100 may derive the above execution time of the core for each layer of the target neural network 110. Also, the parallelization apparatus 100 may analyze a time required for a cluster of the manycore system 120 to execute each layer based on a processing speed of the cluster and an amount of computational operation for each layer. Similarly, the parallelization apparatus 100 may derive an execution time of the cluster for each layer of the target neural network 110.

The parallelization apparatus 100 may determine a size of an output (for example, an output feature map) of each layer based on the operation information of the parallelization apparatus 100. The size of the output may be associated with a communication cost of each core of the manycore system 120 and/or an amount of communication traffic. For example, in a parallel processing process, an output of a core of the first cluster 121 may be transmitted to another core of the first cluster 121 or the second cluster 122. For example, an operation of a second layer 112 may be based on an output of a first layer 111, because an operation of the first layer 111 and the operation of the second layer 112 may be performed in different cores. Thus, the parallelization apparatus 100 may determine a communication cost required to transmit processing results between cores of the manycore system 120 based on a size of an output of each layer.

When the profiling result is generated, the parallelization apparatus 100 may determine a parallelization strategy based on the profiling result. The parallelization strategy may include an assignment strategy and a batch strategy. The assignment strategy may be used to optimally assign a plurality of cores of each of the plurality of clusters (for example, the first cluster 121 or the second cluster 122) to the plurality of layers (for example, the first layer 111 and the second layer 112) of the target neural network 110. The batch strategy may be used to determine a number of batches (for example, a number of mini-batches or a number of micro-batches) optimized to assignment states of the plurality of cores according to the assignment strategy.

When the parallelization strategy is determined, the manycore system 120 may quickly derive a processing result by performing parallel processing of the target neural network 110 according to the parallelization strategy. The manycore system 120 may perform the parallelization strategy based on a control of a runtime engine of the parallelization apparatus 100. The runtime engine may verify idle resources of the manycore system 120, may assign each sub-network of the target neural network 110 to each cluster of the manycore system 120 according to a given parallelization strategy, and may execute the target neural network 110 in the manycore system 120.

Figure 2A:
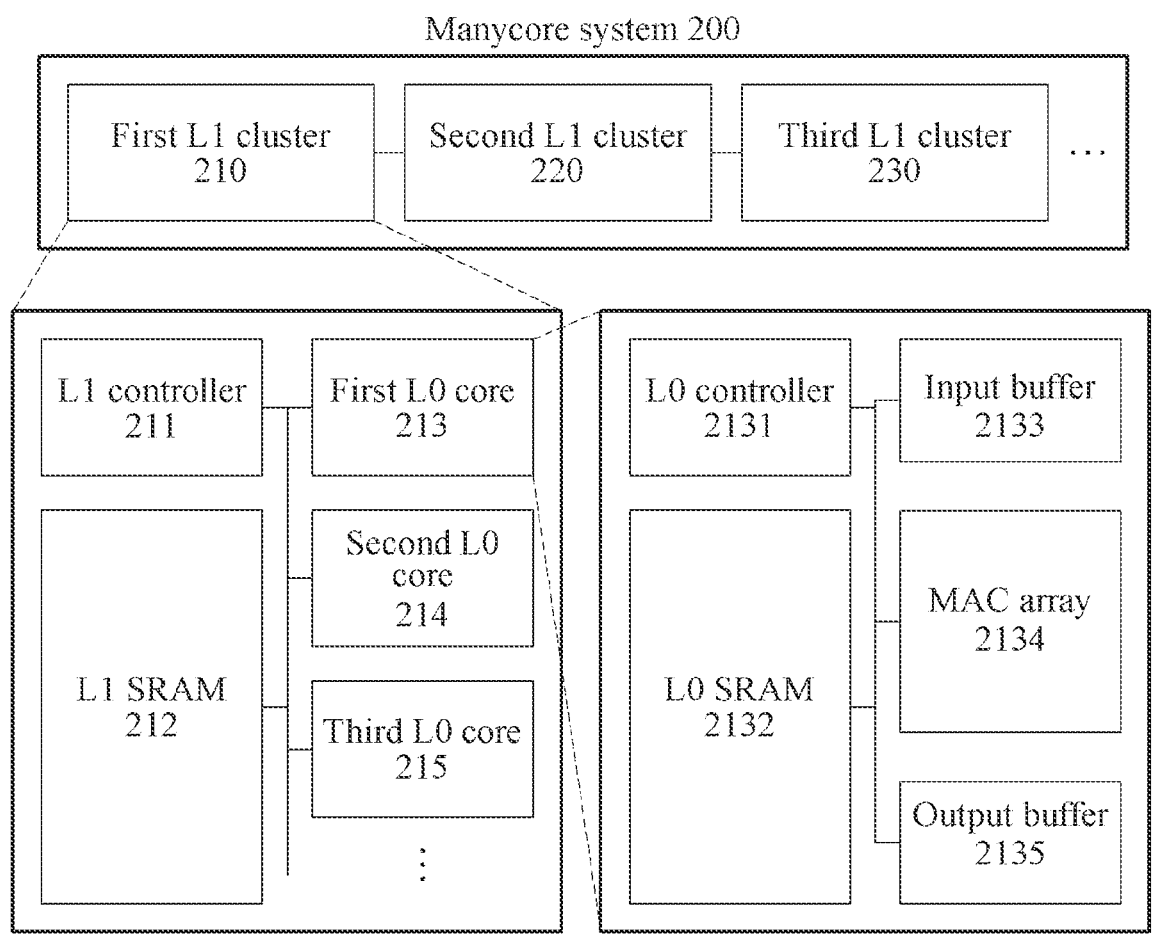
FIG. 2A illustrates an example of an architecture of a manycore system.

FIG. 2A illustrates an example of an architecture of a manycore system (for example, a manycore system 200). The manycore system 200 may have a network-on-chip (NoC) structure to accelerate a neural network model using a plurality of cores.

Referring to FIG. 2A, the manycore system 200 may include a plurality of L1 clusters, and may process a given operation using the plurality of L1 clusters. FIG. 2A illustrates a configuration of a first L1 cluster 210 among the plurality of L1 clusters. The first L1 cluster 210 may include a plurality of L0 cores configured to perform given operations, an L1 static random-access memory (SRAM) 212 that is shared and used by the plurality of L0 cores and an L1 controller 211 configured to control the L1 SRAM 212 and the L0 cores. The other L1 clusters (for example, a second L1 cluster 220 and a third L1 cluster 230) may have the same configuration as that of the first L1 cluster 210. Also, all the L1 clusters may have the same performance. Here, L denotes a level, and the larger the number behind L, the higher the level.

FIG. 2A illustrates a configuration of a first L0 core 213 among the plurality of L0 cores. The first L0 core 213 may include an L0 SRAM 2132 individually used by the first L0 core 213, a MAC array 2134 configured to perform an operation, an input buffer 2133 configured to temporarily store input data, an output buffer 2135 configured to temporarily store output data, and an L0 controller 2131 configured to control the L0 SRAM 2132, the input buffer 2133, the MAC array 2134 and the output buffer 2135. The other L0 cores (for example, a second L0 core 214 and a third L0 core 215) may have the same configuration as that of the first L0 core 213. Also, all the L0 cores may have the same performance. When all the L1 clusters have the same performance and all the L0 cores have the same performance, a parallelization strategy including core assignment may be more easily established. Architecture information used by a parallelization apparatus to establish the parallelization strategy may include information about an architecture of the manycore system 200.

Figure 2B:
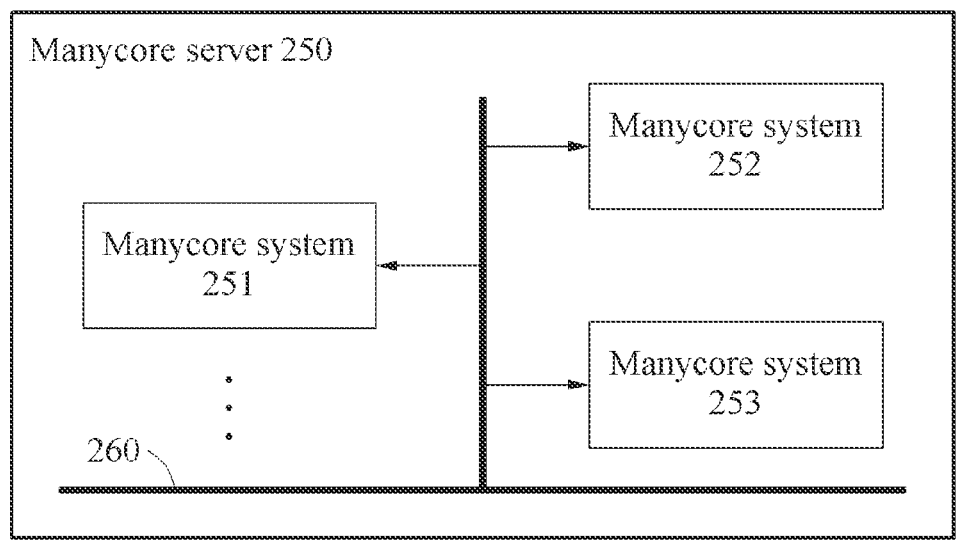
FIG. 2B illustrates an example of a manycore server including a plurality of manycore systems.

FIG. 2B illustrates an example of a manycore server (for example, a manycore server 250) including a plurality of manycore systems. Referring to FIG. 2B, the manycore server 250 may include a plurality of manycore systems 251, 252, and 253. The manycore systems 251, 252, and 253 may be implemented at the device level, and the manycore systems 251, 252, and 253 at the device level may be combined to form the manycore server 250. Each of the manycore systems 251, 252, and 253 may correspond to the manycore system 200 of FIG. 2A. A parallelization apparatus may generate a parallelization strategy at a level of a server including the manycore systems 251, 252, and 253. Operations of a neural network may be distributed to the manycore systems 251, 252, and 253 according to the parallelization strategy, and the manycore systems 251, 252, and 253 may individually perform parallel processing using L0 cores thereof. The manycore systems 251, 252, and 253 may communicate using a bus architecture 260.

Figure 3:
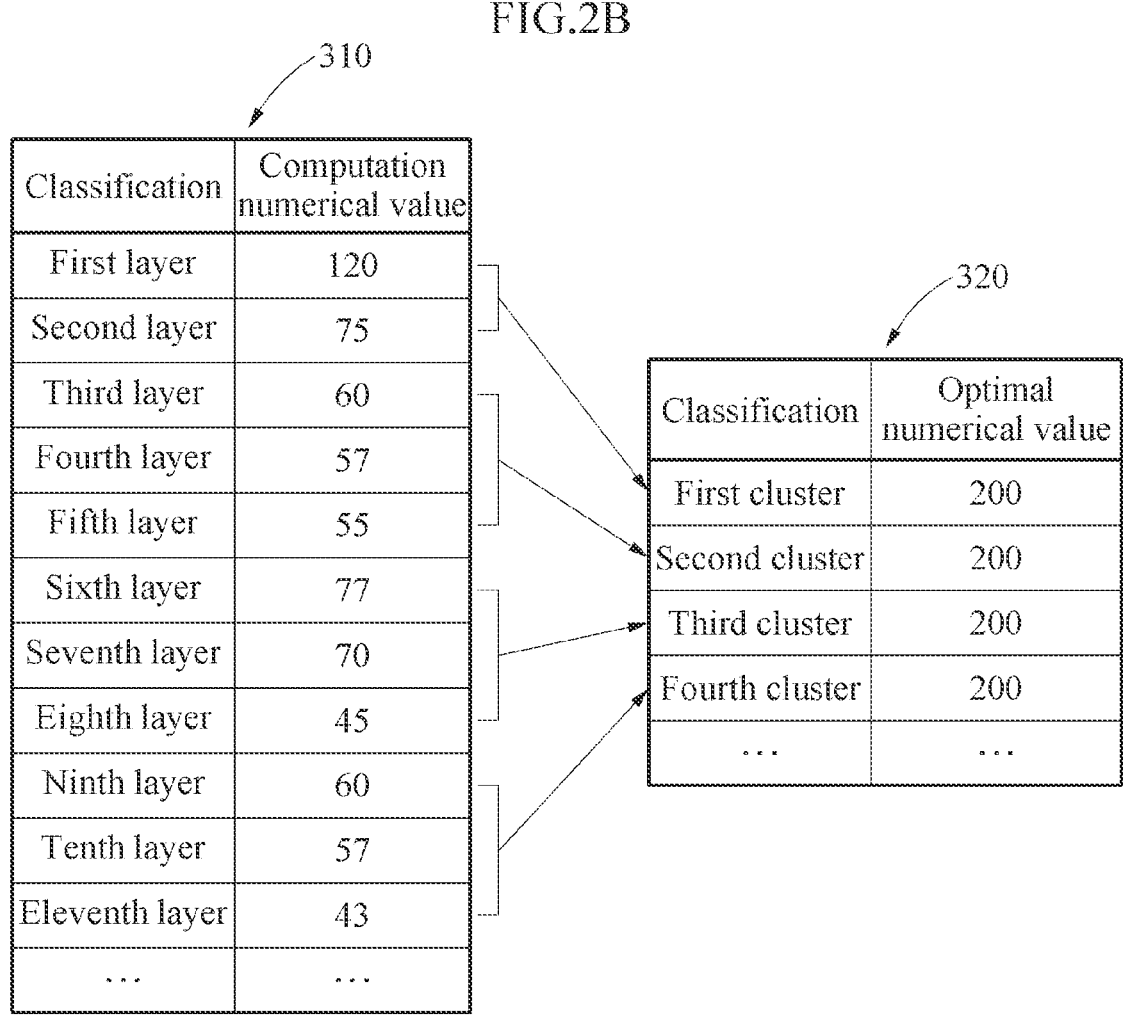
FIG. 3 illustrates an example of a process of distributing sub-networks.

FIG. 3 illustrates an example of a process of distributing sub-networks. In FIG. 3, a table 310 shows computation numerical value information of a target neural network, and a table 320 shows optimal numerical value information of a manycore system. A parallelization apparatus may partition layers of the target neural network into sub-networks based on the computation numerical value information of the target neural network and the optimal numerical value information of the manycore system, and may distribute the sub-networks to clusters of the manycore system, respectively. Each of the sub-networks may include a single layer or a plurality of consecutive layers among a plurality of layers of the target neural network. Thus, the sub-networks may one-to-one match the clusters.

The parallelization apparatus may partition the target neural network into a plurality of sub-networks based on a time required for a single cluster of the manycore system to execute a single layer of the target neural network, and may distribute the sub-networks to the plurality of clusters. The computation numerical value information may indicate a time required for a single cluster to execute each layer, and the optimal numerical value information may indicate a computation numerical value of each cluster exhibiting the highest performance. Optimal numerical values of clusters may be set to be equal to each other, because such optimal numerical values may assist in pipeline processing.

Referring to FIG. 3, a first layer and a second layer have computation numerical values of "120" and "75", respectively, and a sum thereof is "195". Since "195" is close to "200" that is an optimal numerical value of each cluster, a sub-network including the first layer and the second layer may be suitable to be distributed to a single cluster. Thus, the parallelization apparatus may distribute the first layer and the second layer as a first sub-network to a first cluster.

Similarly, the parallelization apparatus may distribute a third layer, a fourth layer, and a fifth layer that have computation numerical values of "60", "57" and "55", respectively, and of which a sum is "172", as a second sub-network to a second cluster, and may distribute a sixth layer, a seventh layer, and an eighth layer that have computation numerical values of "77", "70" and "45", respectively, and of which a sum is "192", as a third sub-network to a third cluster. Also, the parallelization apparatus may distribute a ninth layer, a tenth layer and an eleventh layer that have computation numerical values of "60", "57" and "43", respectively, and of which a sum is "160", as a fourth sub-network to a fourth cluster. The parallelization apparatus may derive a solution using a greedy algorithm. In a non-limiting example, the parallelization apparatus may distribute a sub-network as a maximum number of consecutive layers having a sum of computation numerical values less than or equal to the optimal numerical value.

Figure 4A:
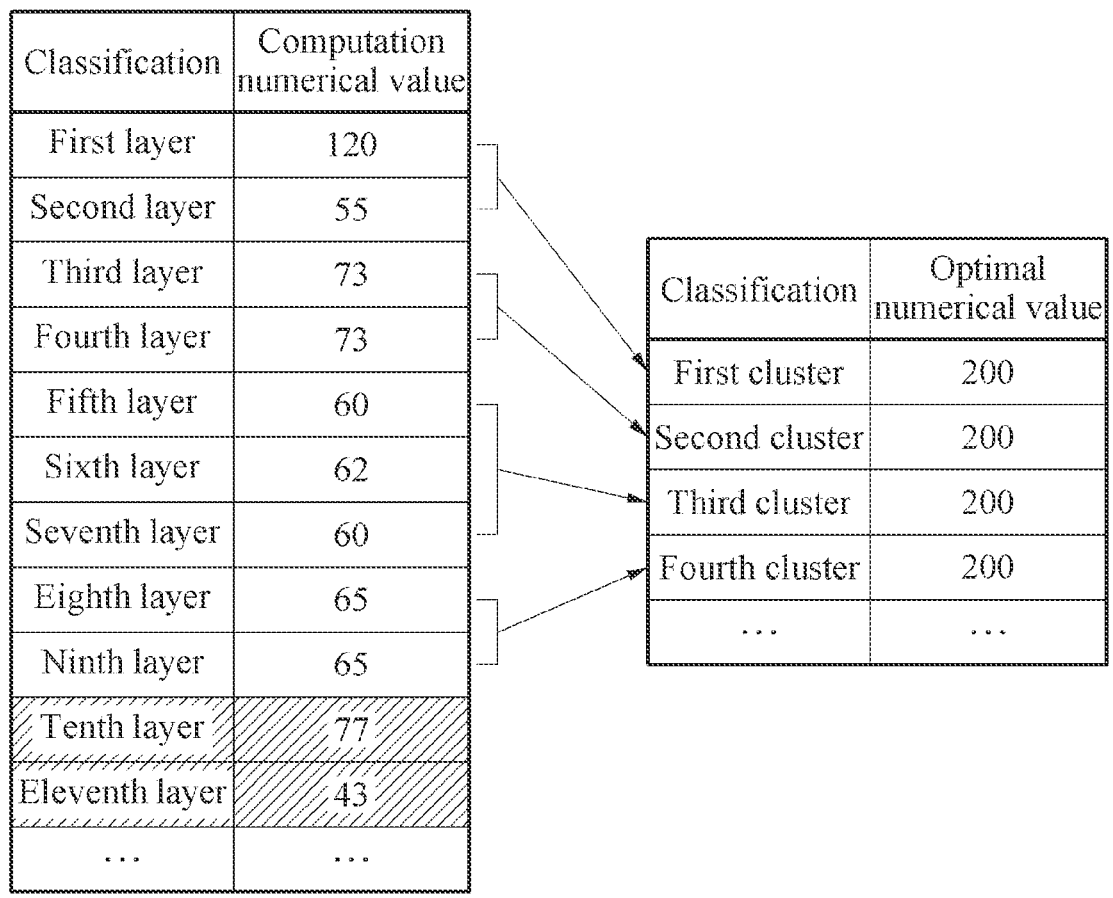
Figure 4B:
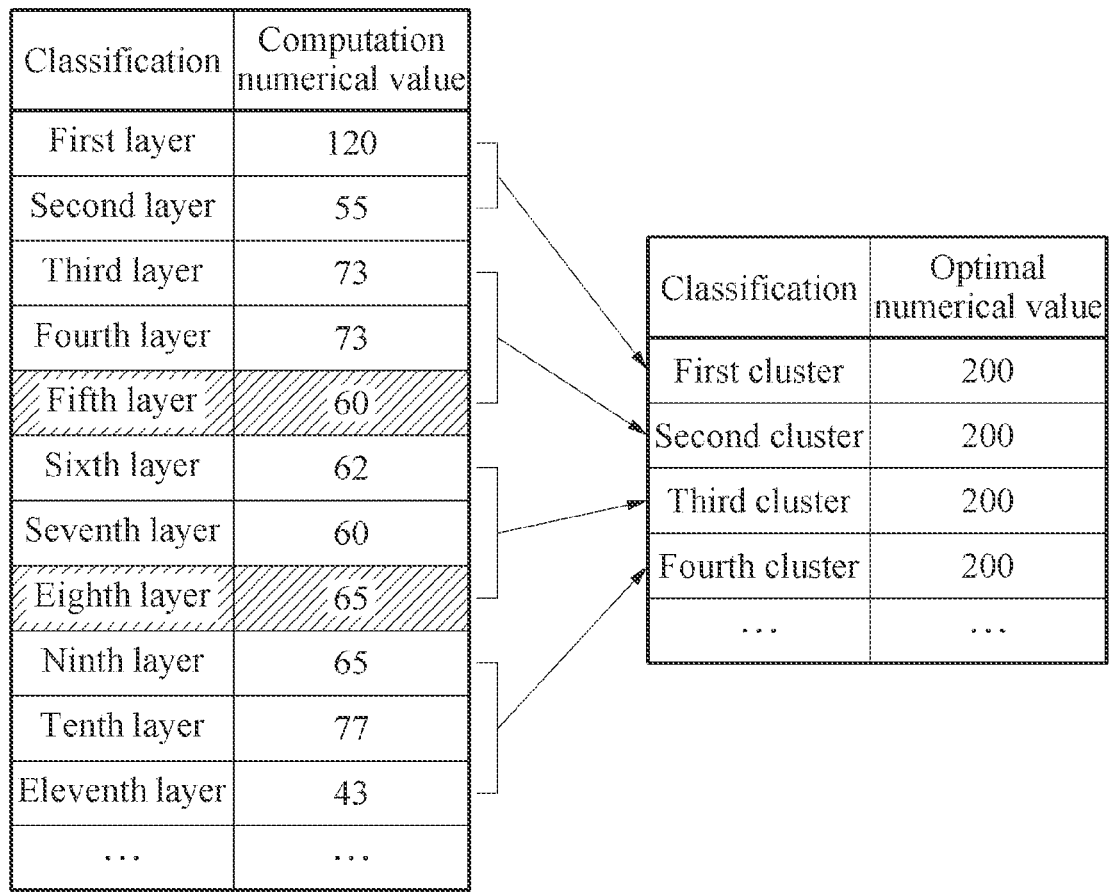

FIGS. 4A, 4B and 4C illustrate examples of a process of distributing sub-networks. Referring to FIG. 4A, in a similar manner to that of FIG. 3, a parallelization apparatus may distribute a first layer and a second layer that have computation numerical values of "120" and "55", respectively, and of which a sum is "175", to a first cluster, and may distribute a third layer and a fourth layer that have computation numerical values of "73", and of which a sum is "146", to a second cluster. Also, the parallelization apparatus may distribute a fifth layer, a sixth layer and a seventh layer that have computation numerical values of "60", "62" and "60", respectively, and of which a sum is "182", to a third cluster, and may distribute an eighth layer and a ninth layer that have computation numerical values of "65", and of which a sum is "130", to a fourth cluster. Although a scheme of FIG. 3 is used, a layer such as a tenth layer and an eleventh layer may not yet be distributed.

For example, when a layer is not yet distributed, the parallelization apparatus may attempt to redistribute the layer based on a residual computational capacity of each cluster and computation numerical values of layers that are already distributed. In this example, the parallelization apparatus may perform redistribution so that the computation numerical values may be distributed as uniformly as possible to each cluster even though a computation numerical value exceeds an optimal numerical value of a cluster. This is because the redistribution may assist in pipeline processing. Referring to FIG. 4B, the parallelization apparatus may modify a strategy to distribute the fifth layer to the second cluster, instead of the third cluster, and distribute the eighth layer to the third cluster, instead of the fourth cluster. Thus, the tenth layer and the eleventh layer may be distributed to the fourth cluster, and there is no undistributed layer. In a non-limiting example, in response to one or more undistributed layers when the sub-networks are distributed as a maximum number of consecutive layers having a sum of computation numerical values less than or equal to the optimal numerical value, the parallelization apparatus may redistribute the sub-networks to minimize a maximum difference among differences between the optimal numerical value and each of the sums of computation numerical values of the clusters.

Referring to FIG. 4C, operations corresponding to computation numerical values of "175", "146", "182", and "130" are assigned to the first through fourth clusters, respectively, before redistribution, and accordingly computation numerical values corresponding to residual computational capabilities of the first through fourth clusters may be "25", "54", "18", and "70", respectively. When the strategy is modified so that the fifth layer is distributed to the second cluster, instead of the third cluster, and that the eighth layer is distributed to the third cluster, instead of the fourth cluster, operations corresponding to computation numerical values of "175", "206", "187", and "185" may be assigned to the first through fourth clusters, respectively. Despite a slight over-assignment to the second cluster, computation numerical values may be uniformly distributed to all layers. Thus, it may be confirmed that the strategy may be effectively modified.

Figure 5:
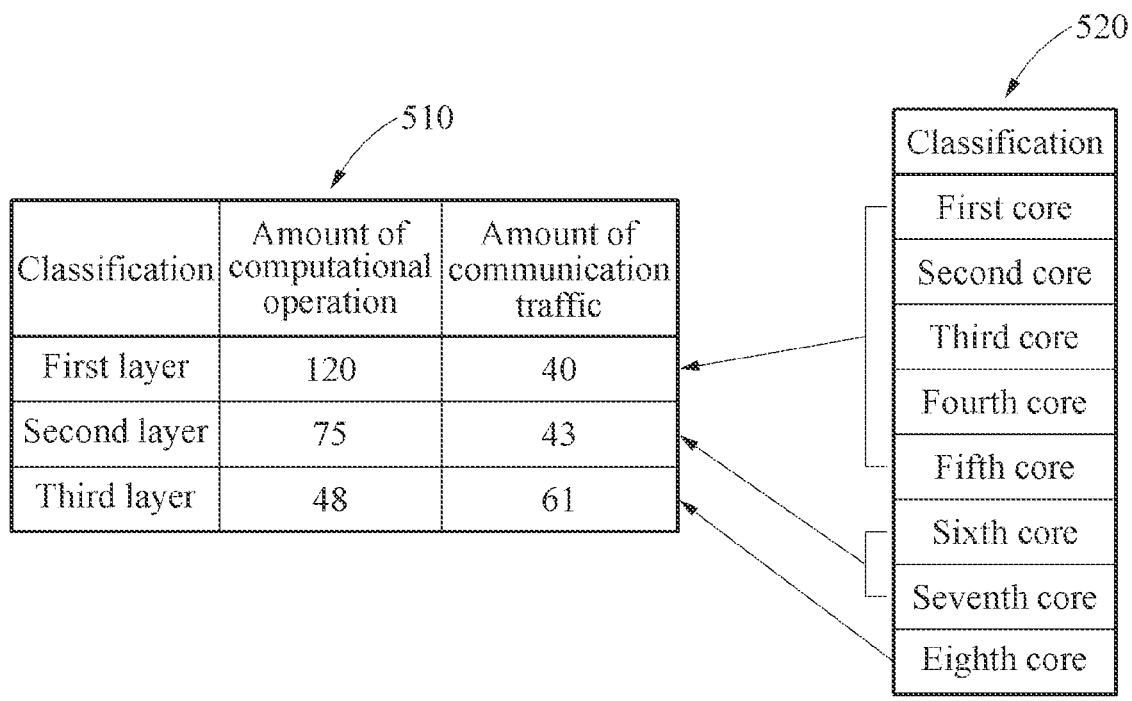
FIG. 5 illustrates an example of a process of assigning cores.

FIG. 5 illustrates an example of a process of assigning cores. When a plurality of layers of a target neural network are completely distributed to clusters of a manycore system, a parallelization apparatus may assign a plurality of cores of each cluster to at least one layer distributed to the cluster. For example, when distribution of layers is completed, each cluster may form a correspondence relationship with a sub-network, and each core of each cluster may be assigned to one layer of a corresponding sub-network.

The parallelization apparatus may assign each core to a layer based on a time required for a single core of the manycore system to execute a single layer of the target neural network.

For example, the parallelization apparatus may assign each core so that $T_l(\text{core})$ may be less than $T_{l+1}(\text{core})$. In this example, $T_l(\text{core})$ denotes an execution time required to execute an l-th layer according to core assignment, and $T_{l+1}(\text{core})$ denotes an execution time required to execute an (l+1)-th layer according to the core assignment. For example, if an execution time for the (l+1)-th layer when two cores are assigned to the (l+1)-th layer is shorter than an execution time for the l-th layer when four cores are assigned to the l-th layer, and is longer than an execution time for the l-th layer when five cores are assigned to the l-th layer, the parallelization apparatus may assign five cores to the l-th layer.

Also, the parallelization apparatus may assign each core to each layer of a corresponding sub-network based on a characteristic of each layer. In FIG. 5, a table 510 shows characteristics for each layer, and a table 520 shows cores (for example, cores of a first cluster). For example, a characteristic of a layer may include an amount of computational operation for processing of a layer and/or an amount of communication traffic for transmitting a processing result of a layer. In this example, the parallelization apparatus may assign a higher priority to the amount of computational operation than to the amount of communication traffic. A large number of cores may be assigned to a layer with a large amount of computational operation, and a small number of cores may be assigned to a layer with a small amount of computational operation. In contrast, a small number of cores may be assigned to a layer with a large amount of communication traffic. This is because a layer with a large amount of communication traffic may have a high probability of having a small input (for example, an input feature map) and a large number of weight kernels. Thus, an execution time for each cluster as well as for each layer may be uniform, and the parallelization apparatus of one or more embodiments may increase an efficiency of pipeline.

Figure 6A:
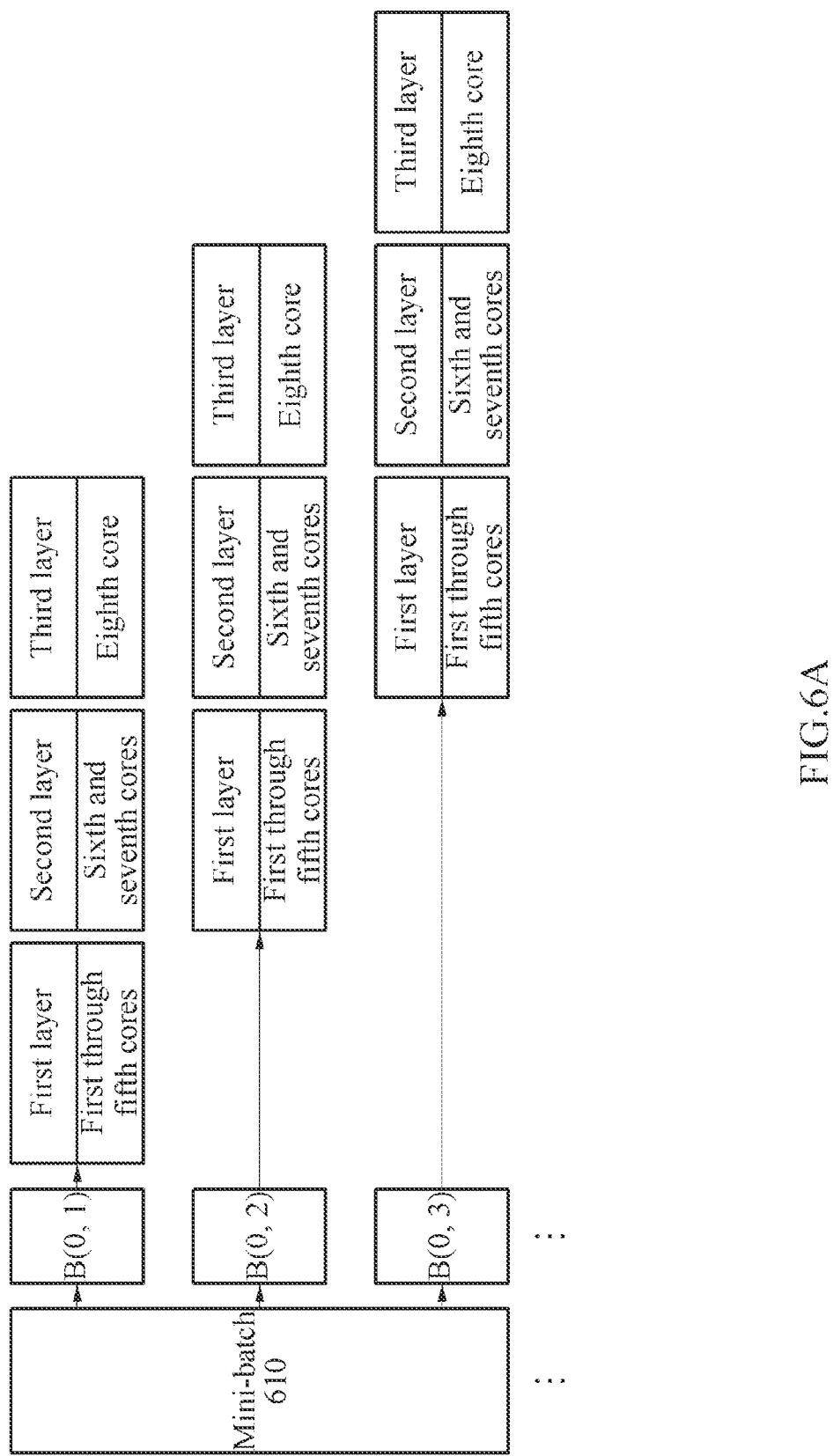

FIGS. 6A and 6B illustrate an example of a mini-batch and an example of a micro-batch. FIG. 6A illustrates an example in which a cluster (for example, a first cluster) including a first core through an eighth core process a sub-network including a first layer through a third layer based on a mini-batch 610. Referring to FIG. 6A, the mini-batch 610 may be denoted by B(i, j). In B(i, j), i denotes an iteration index and may have a value between "0" and "I-1" in which I denotes a total number of iterations, and j denotes a batch index and may have a value between "0" and "J-1" in which J denotes a number of mini-batches.

For B(0, 1), the first core through a fifth core may process an operation of the first layer with respect to first input data and may output (1-1)-th output data. When the operation of the first layer is completed, a sixth core and a seventh core may process an operation of a second layer with respect to the (1-1)-th output data and may output (2-1)-th output data. When the operation of the second layer is completed, the eighth core may process an operation of the third layer with respect to the (2-1)-th output data and may output (3-1)-th output data. The (3-1)-th output data may be transmitted to a next cluster.

For B(0, 2), the first through fifth cores may process an operation of the first layer with respect to second input data and may output (1-2)-th output data. For B(0, 2), the first through fifth cores may process the operation of the first layer with respect to the second input data, immediately after outputting the (1-1)-th output data output for B(0, 1). When the operation of the first layer with respect to the second input data is completed, the sixth and seventh cores may process an operation of the second layer with respect to the (1-2)-th output data and may output (2-2)-th output data. For B(0, 2), he sixth and seventh cores may start to process the (2-2)-th output data, immediately after outputting the (2-1)-th output data output for B(0, 1). For remaining portions of B(0, 2) and for B(0, 3), each core may perform a similar process to that described above.

FIG. 6B illustrates an example in which B(0, 1) of FIG. 6A is replaced by a micro-batch 620. Referring to FIG. 6B, the micro-batch 620 may be denoted by MB(u, v). Similar to the mini-batch 610, u denotes an iteration index and may have a value between "0" and "U-1" in which U denotes a total number of iterations, and v denotes a batch index and may have a value between "0" and "V-1" in which V denotes a number of micro-batches.

A parallelization apparatus may generate a batch strategy including a number of micro-batches based on assignment states of cores according to an assignment strategy. Referring to FIG. 6B, MB(0, 1) and MB(1, 1) corresponding to B(0, 1) may be performed.

For MB(0, 1) and MB(1, 1), the first through fifth cores may output (1-1)-th output data by processing an operation of the first layer with respect to first input data, and may output (1-2)-th output data by processing an operation of the first layer with respect to second input data, in a successive manner. When the (1-1)-th output data is output, the sixth and seventh cores may output (2-1)-th output data by processing an operation of the second layer with respect to the (1-1)-th output data, and may successively output (2-2)-th output data by processing an operation of the second layer with respect to the (1-2)-th output data, in a successive manner. When the (2-1)-th output data is output, the eighth core may output (3-1)-th output data by processing an operation of the third layer with respect to the (2-1)-th output data, and may successively output (3-2)-th output data by processing an operation of the third layer with respect to the (2-2)-th output data, in a successive manner. The (3-1)-th output data and the (3-2)-th output data may be transmitted to a next cluster.

When the number of mini-batches is increased to a predetermined level, a time until a result is converged may be shortened, but when the number of mini-batches exceeds the level, the time may be increased. This may be because a bottleneck phenomenon occurs during a data transmission between cores. The parallelization apparatus may alleviate the above phenomenon by converting the mini-batch 610 to the micro-batch 620. Thus, a point in time at which an output of the third layer starts to be transmitted to the next cluster, that is, an amount of time until an operation of the eighth core is completed may be shortened by a time difference 630. However, when a number of micro-batches is excessively increased, a processing efficiency may be lowered due to an increase in communication costs between cores and an increase in the number of iterations. The parallelization apparatus may determine the number of micro-batches based on a processing speed and efficiency. For example, the parallelization apparatus may determine the number V of micro-batches and the number J of mini-batches to range from ½ to ⅓. In FIG. 6B, V may be ½ of J.

Figure 7:
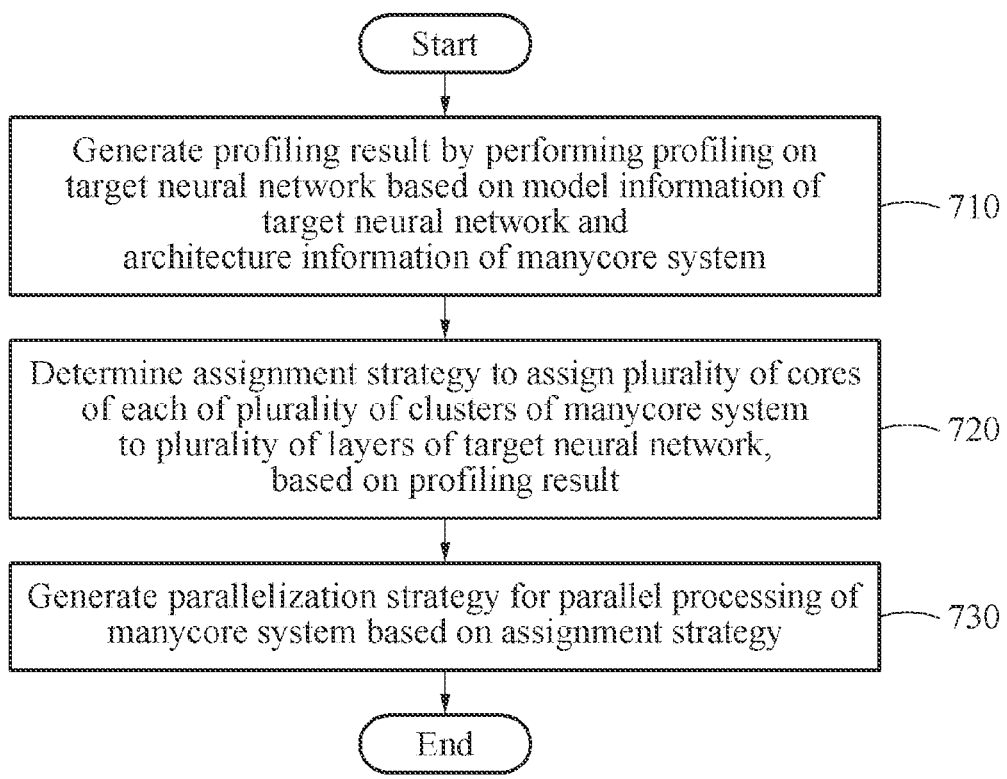
FIG. 7 illustrates an example of a parallelization method.

FIG. 7 illustrates an example of a parallelization method. Referring to FIG. 7, in operation 710, a parallelization apparatus may generate a profiling result by performing profiling on a target neural network based on model information of the target neural network and architecture information of a manycore system. In operation 720, the parallelization apparatus may determine an assignment strategy to assign a plurality of cores of each of a plurality of clusters of the manycore system to a plurality of layers of the target neural network, based on the profiling result. In operation 730, the parallelization apparatus may generate a parallelization strategy for parallel processing of the manycore system based on the assignment strategy. In addition, the description of FIGS. 1 through 6B above, 8 and 9 below is also applicable to the parallelization method.

Figure 8:
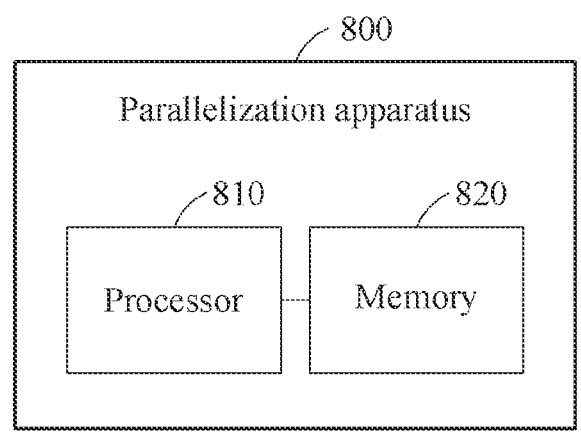
FIG. 8 illustrates an example of a configuration of a parallelization apparatus.

FIG. 8 illustrates an example of a configuration of a parallelization apparatus (for example, a parallelization apparatus 800). Referring to FIG. 8, the parallelization apparatus 800 may include a processor 810 (for example, one or more processors) and a memory 820 (for example one or more memories). The memory 820 may be connected to the processor 810, and may store instructions executable by the processor 810, data to be computed by the processor 810, or data processed by the processor 810. The memory 820 may include, for example, a non-transitory computer-readable storage medium, for example, a high-speed random access memory (RAM) and/or a non-volatile computer-readable storage medium (for example, at least one disk storage device, a flash memory device, or other non-volatile solid state memory devices).

The processor 810 may execute instructions to perform the operations described above with reference to FIGS. 1 through 7 above and FIG. 9 below. For example, the processor 810 may generate a profiling result by performing profiling on a target neural network based on model information of the target neural network and architecture information of a manycore system, may determine an assignment strategy to assign a plurality of cores of each of a plurality of clusters of the manycore system to a plurality of layers of the target neural network, based on the profiling result, and may generate a parallelization strategy for parallel processing of the manycore system based on the assignment strategy. In addition, the description of FIGS. 1 through 7 and 9 is also applicable to the parallelization apparatus 800.

Figure 9:
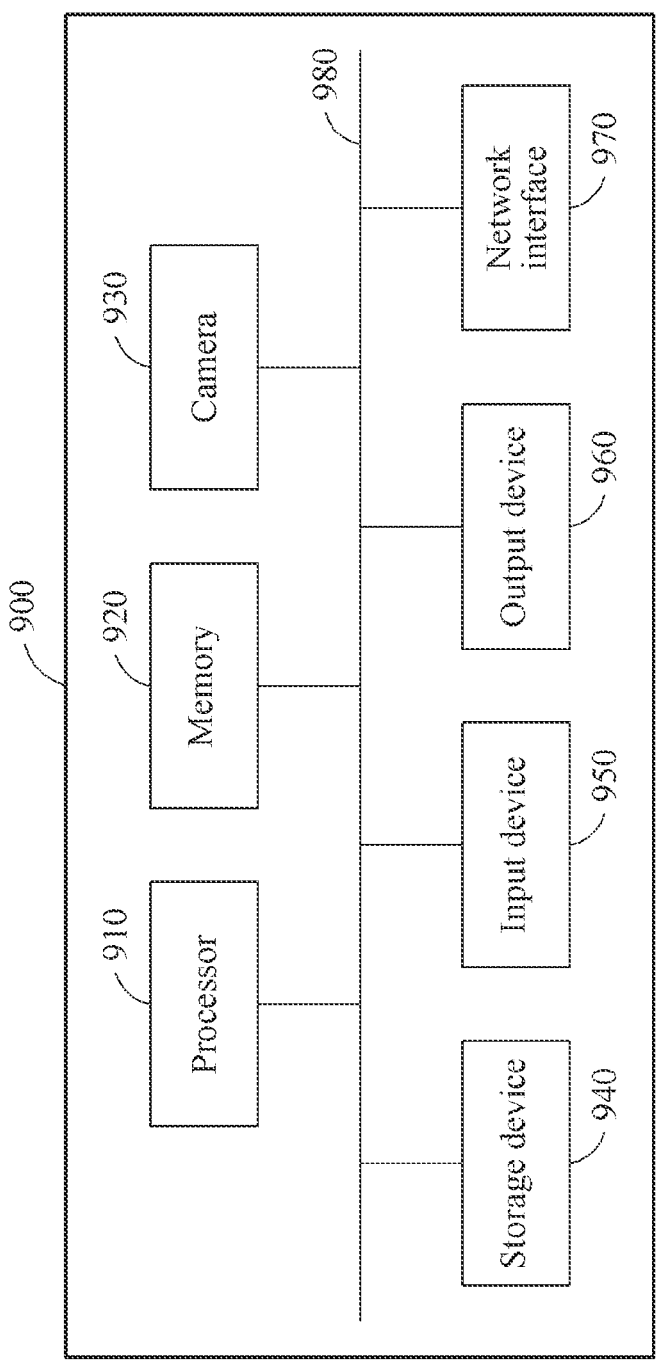
FIG. 9 illustrates an example of a configuration of an electronic apparatus.

FIG. 9 illustrates an example of a configuration of an electronic apparatus (for example, an electronic apparatus 900). Referring to FIG. 9, the electronic apparatus 900 may include a processor 910 (for example, one or more processors), a memory 920 (for example, one or more memories), a camera 930, a storage device 940, an input device 950, an output device 960, and a network interface 970. The processor 910, the memory 920, the camera 930, the storage device 940, the input device 950, the output device 960, and the network interface 970 may communicate with each other via a communication bus 980. For example, the electronic apparatus 900 may be implemented as at least a portion of, for example, a mobile device such as a mobile phone, a smartphone, a personal digital assistant (PDA), a netbook, a tablet computer or a laptop computer, a wearable device such as a smartwatch, a smart band or smart glasses, a computing device such as a desktop or a server, home appliances such as a television (TV), a smart TV or a refrigerator, a security device such as a door lock, or a vehicle such as a smart vehicle. The electronic apparatus 900 may structurally and/or functionally include the parallelization apparatus 100 of FIG. 1 and/or the parallelization apparatus 800 of FIG. 8.

The processor 910 may execute instructions and functions in the electronic apparatus 900. For example, the processor 910 may process instructions stored in the memory 920 or the storage device 940. The processor 910 may perform the operations described above with reference to FIGS. 1 through 8. The memory 920 may include a non-transitory computer-readable storage medium or a non-transitory computer-readable storage device. The memory 920 may store instructions that are to be executed by the processor 910, and may also store information associated with software and/or applications when the software and/or applications are being executed by the electronic apparatus 900.

The camera 930 may capture a photo and/or a video. For example, the camera 930 may capture a facial image including a face of a user. The camera 930 may provide a three-dimensional (3D) image including depth information associated with objects.

The storage device 940 may include a non-transitory computer-readable storage medium or a non-transitory computer-readable storage device. In an example, the storage device 940 may store a greater amount of information than that of the memory 920 for a relatively long period of time. For example, the storage device 940 may include magnetic hard disks, optical disks, flash memories, floppy disks, or other forms of non-volatile memories known in the art.

The input device 950 may receive an input from a user through a traditional input scheme using a keyboard and a mouse, and through a new input scheme such as a touch input, a voice input and an image input. The input device 950 may include, for example, a keyboard, a mouse, a touch screen, a microphone, or other devices configured to detect an input from a user and transmit the detected input to the electronic apparatus 900.

The output device 960 may provide a user with an output of the electronic apparatus 900 through a visual channel, an auditory channel, or a tactile channel. The output device 960 may include, for example, a display, a touchscreen, a speaker, a vibration generator, or any other device configured to provide a user with the output. The network interface 970 may communicate with an external device via a wired or wireless network.

The parallelization apparatuses, manycore systems, first clusters, second clusters, first L1 clusters, second L1 clusters, third L1 clusters, L1 controllers, L1 SRAMs, first L0 cores, second L0 cores, third L0 cores, L0 controllers, L0 SRAMs, input buffers, MAC arrays, output buffers, manycore servers, bus architectures, processors, memories, electronic apparatuses, cameras, storage devices, input devices, output devices, network interfaces, communication buses, parallelization apparatus 100, manycore system 120, first cluster 121, second cluster 122, manycore system 200, first L1 cluster 210, second L1 cluster 220, third L1 cluster 230, L1 controller 211, L1 SRAM 212, first L0 core 213, second L0 core 214, third L0 core 215, L0 controller 2131, L0 SRAM 2132, input buffer 2133, MAC array 2134, output buffer 2135, manycore server 250, manycore system 251, manycore system 252, manycore system 253, bus architecture 260, parallelization apparatus 800, processor 810, memory 820, electronic apparatus 900, processor 910, memory 920, camera 930, storage device 940, input device 950, output device 960, network interface 970, communication bus 980, apparatuses, units, modules, devices, and other components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrates in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A parallelization method comprising:
generating a profiling result by performing profiling on a target neural network based on model information of the target neural network and architecture information of a manycore system;
determining an assignment strategy to assign a plurality of cores of each of a plurality of clusters of the manycore system to a plurality of layers of the target neural network, based on the profiling result; and
generating a parallelization strategy for parallel processing of the manycore system based on the assignment strategy,
wherein the profiling result comprises a communication cost and a unit execution time,
wherein the communication cost is a cost to transmit processing results between cores of the manycore system, and
wherein the execution time is based on at least one of
a time for a single core of the manycore system to execute a single layer of the target neural network, or
a time for a single cluster of the manycore system to execute a single layer of the target neural network.

2. The method of claim 1, wherein the generating of the profiling result comprises generating the profiling result by pre-executing the target neural network based on test data.

3. The method of claim 1, wherein the determining of the assignment strategy comprises:
   partitioning the target neural network into a plurality of sub-networks and distributing the plurality of sub-networks to the plurality of clusters; and
   assigning a plurality of cores of each of the plurality of clusters to one or more layers of a corresponding sub-network among the plurality of sub-networks.

4. The method of claim 3, wherein each of the plurality of sub-networks comprises either one of a single layer and a plurality of consecutive layers among the plurality of layers of the target neural network.

5. The method of claim 3, wherein the partitioning of the target neural network comprises:
   partitioning the target neural network into the plurality of sub-networks based on a time for a single cluster of the manycore system to execute a single layer of the target neural network; and
   distributing the plurality of sub-networks to the plurality of clusters.

6. The method of claim 3, wherein the assigning of the plurality of cores to the one or more layers comprises assigning the plurality of cores to the one or more layers based on a time for a single core of the manycore system to execute a single layer of the target neural network.

7. The method of claim 3, wherein the assigning of the plurality of cores to the one or more layers comprises assigning the plurality of cores to the one or more layers based on a characteristic of each layer of the corresponding sub-network.

8. The method of claim 7, wherein the characteristic of each layer comprises any one or any combination of an amount of computational operation for processing of each layer and an amount of communication traffic for transmitting a processing result of each layer.

9. The method of claim 8, wherein, for the assigning of the plurality of cores to the one or more layers, a higher priority is assigned to the amount of computational operation than to the amount of communication traffic.

10. The method of claim 1, further comprising:
    generating a batch strategy comprising a number of micro-batches based on assignment states of the plurality of cores according to the assignment strategy.

11. The method of claim 1, wherein the assignment strategy includes information for different clusters to be provided same batch information at different times.

12. A non-transitory computer-readable storage medium storing instructions that, when executed by a processor, configure the processor to perform the method of claim 1.

13. A parallelization apparatus comprising:
    a processor configured to:
    generate a profiling result by performing profiling on a target neural network based on model information of the target neural network and architecture information of a manycore system;
    determine an assignment strategy to assign a plurality of cores of each of a plurality of clusters of the manycore system to a plurality of layers of the target neural network, based on the profiling result; and
    generate a parallelization strategy for parallel processing of the manycore system based on the assignment strategy,
    wherein the profiling result comprises a communication cost and a unit execution time,
    wherein the communication cost is a cost to transmit processing results between cores of the manycore system, and
    wherein the unit execution time is based on at least one of
       a time for a single core of the manycore system to execute a single layer of the target neural network, or
       a time for a single cluster of the manycore system to execute a single layer of the target neural network.

14. The apparatus of claim 13, wherein, for the generating of the profiling result, the processor is configured to generate the profiling result by pre-executing the target neural network based on test data.

15. The apparatus of claim 13, wherein, for the determining of the assignment strategy, the processor is configured to:
    partition the target neural network into a plurality of sub-networks, to distribute the plurality of sub-networks to the plurality of clusters; and
    assign a plurality of cores of each of the plurality of clusters to one or more layers of a corresponding sub-network among the plurality of sub-networks, to determine the assignment strategy.

16. The apparatus of claim 15, wherein, for the partitioning of the target neural network, the processor is configured to:
    partition the target neural network into the plurality of sub-networks based on a time for a single cluster of the manycore system to execute a single layer of the target neural network; and
    distribute the plurality of sub-networks to the plurality of clusters.

17. The apparatus of claim 15, wherein, for the assigning of the plurality of cores to the one or more layers, the processor is configured to assign the plurality of cores to the one or more layers based on a time for a single core of the manycore system to execute a single layer of the target neural network.

18. The apparatus of claim 15, wherein, for the assigning of the plurality of cores to the one or more layers, the processor is configured to assign the plurality of cores to the one or more layers based on a characteristic of each layer of the corresponding sub-network.

19. The apparatus of claim 13, wherein the processor is configured to further generate a batch strategy comprising a number of micro-batches based on assignment states of the plurality of cores according to the assignment strategy.

20. The apparatus of claim 13, further comprising a memory storing instructions that, when executed by the processor, configure the processor to perform the generating of the profiling result, the determining of the assignment strategy, and the generating of the parallelization strategy.

21. The apparatus of claim 13, wherein the assignment strategy includes information for different clusters to be provided same batch information at different times.

* * * * *